United States Patent [19]

Justice, Jr. et al.

[11] Patent Number: 5,253,217
[45] Date of Patent: Oct. 12, 1993

[54] METHOD FOR SEISMIC EXPLORATION INCLUDING COMPENSATION FOR NEAR SURFACE EFFECTS

[75] Inventors: Mahlon G. Justice, Jr.; Tom P. Airhart, both of Plano, Tex.

[73] Assignee: Atlantic Richfield Company, Los Angeles, Calif.

[21] Appl. No.: 339,341

[22] Filed: Apr. 14, 1989

[51] Int. Cl.$^5$ .............................................. G01V 1/36
[52] U.S. Cl. ............................................ 367/46; 367/57; 364/421
[58] Field of Search .................. 367/21, 45, 46, 57; 364/421

[56] References Cited

U.S. PATENT DOCUMENTS

| | | | |
|---|---|---|---|
| 3,680,040 | 7/1972 | Silverman et al. | 367/41 |
| 3,866,161 | 2/1975 | Barr, Jr. | 367/56 |
| 4,706,225 | 11/1987 | Raoult | 367/57 |
| 4,750,157 | 6/1988 | Shei | 367/45 |

OTHER PUBLICATIONS

"Encyclopedic Dictionary of Exploration Geophysics", p. 47, Sheriff, R. E., Seg, TN 269 SB4 C.3 1973.
"Reflection Siesmology", Waters, R. H., John Wiley and Sons, publishers, 1981, TN 269 W37, pp. 205, 362.
Scarf et al, Z. Angew Geol, vol. 28, #3, pp. 117-122, Mar. 1982 (German); abstract only attached.
Hutchinson, D., 49th Europe Ass. Explor. Geophys. Mtg., Jun. 12 1987, pp. 43-44; abst. only supplied.

*Primary Examiner*—Nelson Moskowitz
*Attorney, Agent, or Firm*—Robert M. Betz

[57] ABSTRACT

A method of seismic exploration is disclosed wherein a signal recording obtained from subsurface geophone receivers placed below the weathered layer is used to characterize the waveform of the downgoing signal generated in the earth by a surface seismic source. The reflections of the source signal measured at the earth's surface at a point remote from this source are then deconvolved with an operator derived from the subsurface waveform in order to eliminate or compensate for the filtering effect of the weathered layer. Successive measurements of the downgoing source signal are taken at the earth's surface as the source is advanced along a seismic line. One of such surface signals can be combined with the subsurface signal recording in order to derive a transfer function indicative of such filtering effect for the intervening weathered layer. This transfer function may then be convolved with each of the successive surface signals to predict corresponding updated values for the subsurface waveform (and hence the deconvolution operator) as the source is moved from each shot point to the next.

5 Claims, 4 Drawing Sheets

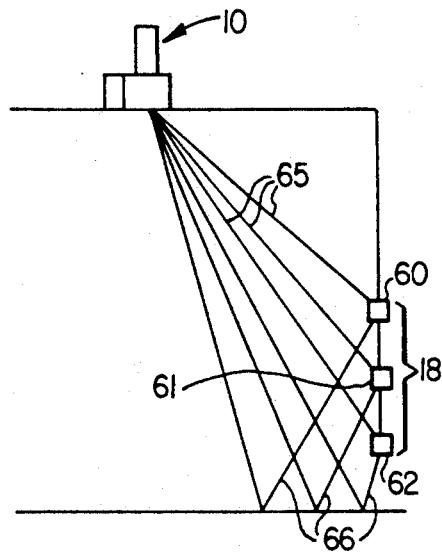
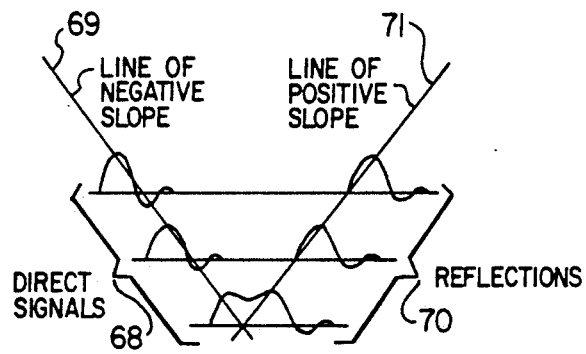
FIG. 4a          FIG. 4b
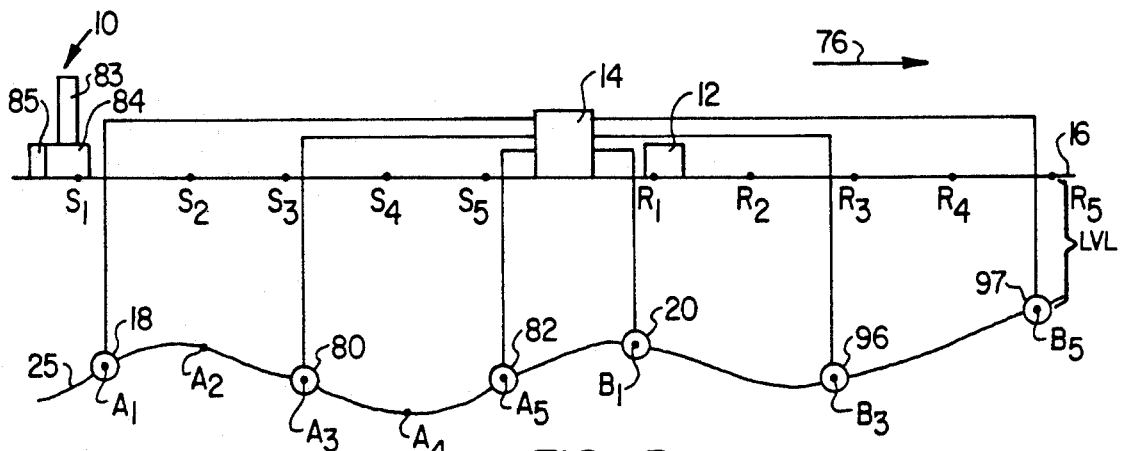
FIG. 5
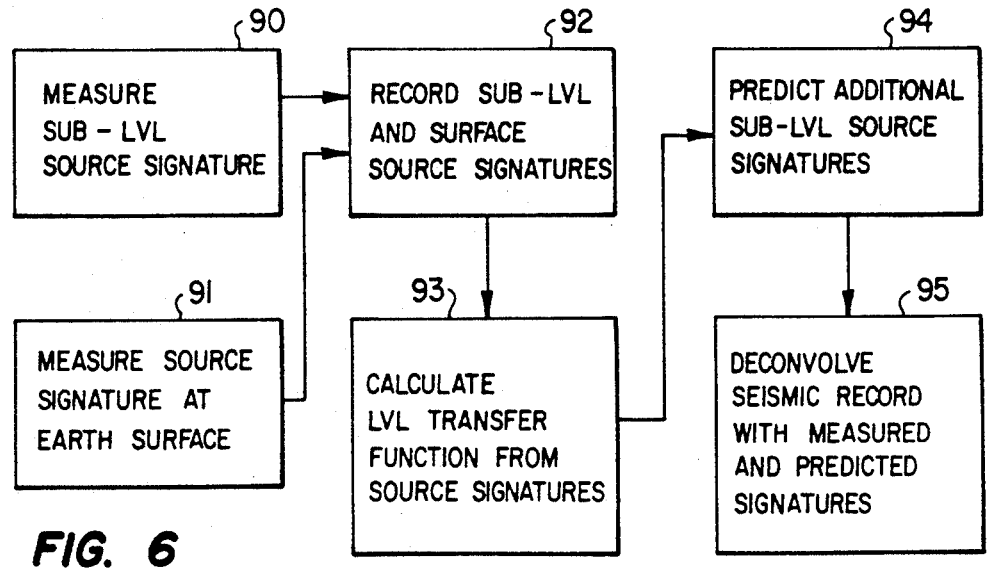
FIG. 6

METHOD FOR SEISMIC EXPLORATION INCLUDING COMPENSATION FOR NEAR SURFACE EFFECTS

BACKGROUND OF THE INVENTION

This invention relates generally to a novel method of seismic exploration and more particularly to a method for surface seismic exploration designed to eliminate or compensate for near surface effects tending to degrade the effectiveness of data acquisition.

The seismic signal resulting from actuation of a seismic source at the surface of the earth undergoes a filtering action as it passes through the earth and is stretched out into a so called "wavelet". Reflection of such wavelet from successive subterranean rock boundaries produces a great number of additional wavelets which may be detected and recorded as a seismic record or seismogram. The recorded wave form or "signature" of each such wavelet is said to constitute the successive convolution of the seismic signal with the various portions of the earth through which the signal or its various wavelet modifications travel. As used in the discussion to follow the term "source signature" shall mean the shape or characteristics of the down going seismic signal at any point along its path. By "primary source signature" shall be meant the signature of the seismic signal before experiencing any filtering effects.

Since the seismic signal returns from deep reflectors as a series of wavelets instead of a series of sharp pulses of very short time duration ("impulses") a seismogram consists of a whole series of overlapping wavelets. What is desired is the echo sequence or impulse response of the earth uncontaminated by the wavelet. In so called "spiking deconvolution" a filter is designed which, when applied to the seismogram removes or "collapses" the wavelet and reveals the echo sequence itself. Techniques for the design of such a spiking filter are well-known to the art. But in order to practice such technique, one must not only make assumptions concerning the properties of the echo sequence but one must either know or make assumptions concerning the characteristics of the wavelet, i.e., the source signature. To the extent that this process requires making guesses or predictions about the nature of the source signature, it is inherently flawed. This problem is clearly outlined in Ziolkowski, *Deconvolution*, copyright 1984 by International Human Resources Development Corporation, Massachusetts, pages 1-12, the contents of which are incorporated herein by reference.

The explorationist is not dependent entirely upon guesswork, however, in the design of a spiking filter. For example, in marine exploration it is possible to measure the characteristics of the signal generated by a marine source utilizing a signature calibration test. Here the pulses are measured well away from the source and far enough from the sea bottom to avoid bottom reflections. Such a signature test reliably reveals the source signature because water is a homogeneous medium. Similar measurements are more difficult on land but have been attempted. For example, surface measurements of earth motion generated by vibratory seismic sources have been performed with the aid of velocity meters attached to vibrator base plates. Standard geophones have also been implanted in the earth's surface immediately adjacent various types of seismic sources. But spiking deconvolution utilizing a source signature obtained by such calibration tests, so-called "signature deconvolution", is hampered by the fact that these signatures are not those of the down going wavelet which is seen by the deep reflectors of interest. This is because the wave form of the source undergoes substantial alteration or filtering as it passes through the the earth's near surface layers.

The most important of the near surface layers is usually termed the "weathered layer" or "low velocity layer", often abbreviated "LVL". The LVL lies immediately beneath the surface and includes the topsoil, subsoil, and partially disintegrated or unconsolidated rock. The LVL often varies in thickness, density, lithology, velocity, and attenuation effects.

Various methods have been employed for correcting seismic reflection records to compensate a seismic record for the influence of the LVL involving estimates of signal transit time and frequency dependence for example as determined by an uphole survey. However, near surface effects are frequently much more complicated than can be accounted for through analysis of a small number of uphole tests or by the often used assumption of a simple uniform velocity layer of variable thickness. Consequently, none of the existing near surface corrections presently employed are completely successful.

A general objective of the present invention is to provide a novel method of seismic exploration involving acquisition and processing of seismic records of greater accuracy utilizing improved corrections for near surface effects.

A still further objective of this invention is to devise a method of seismic exploration wherein the source signature utilized in the design of a spiking or signature deconvolution filter is more accurately characterized.

SUMMARY OF THE INVENTION

A method of surface seismic exploration is disclosed which viewed in one aspect comprises the steps of activating a seismic source on the surface of the earth at successive shot points along a seismic line, monitoring the signature of the resultant down-going seismic signal at a depth beneath the surface of the earth wherein such signature is significantly modified by the filtering effect thereon of the near surface low velocity layer, receiving the reflections of the resultant seismic signals at the surface of the earth to produce a seismic record, and deconvolving such seismic record on a shot-by-shot basis by means of a filter derived from such monitored source signature in order to compensate for such filtering effect.

In another aspect, the method of this invention is initiated by a pre-acquisition test comprising the steps of activating a seismic source on the surface of the earth at a first shot point in the vicinity of a seismic line to be traversed, measuring the resultant source signature both at the surface of the earth adjacent such shot point and beneath such shot point at a depth wherein significant modification of this signature has taken place through the filtering effect of the low velocity layer, and deconvolving the surface source signature with the source signature measured at such depth to derive a so-called "transfer function" characteristic of such filtering effect. As the source is sequentially activated at successive shot points in conducting a survey, further surface source signatures are measured at each such successive shot point. These further source signatures are then convolved with this transfer function to mathematically predict successive values beneath such shot points for the corresponding s-b-surface source signatures at such depth attributable to each such shot. The remotely recorded reflection data is then deconvolved on a shot-by-shot basis with spiking filters derived respectively from such predicted source signatures in order to generate a seismic section corrected for said filtering effect.

Different values of the LVL transfer function may be calculated for other pairs of surface and sub-surface source signatures measured in the manner described above at spaced apart locations along a seismic line. In this way transfer functional values can be calculated or approximated by interpolation which fairly closely represent the behavior of the LVL at any point, thus enhancing the accuracy of the predicted sub-surface signatures as described above and consequently enhancing the accuracy of the resultant seismic section.

The embodiments of this invention summarized above compensate the seismic record for the filtering effect of the LVL as the source signal propagates downwardly but do not correct for second order effects resulting from the return of the reflections through the LVL in an upward direction. Therefore, the method of this invention further comprises monitoring the upgoing reflection signature at a subsurface location beneath a spread of surface geophones whose collective output represents the seismic record and at a depth such that said upgoing reflections experience substantial further modification in traversing the overlying regions of the LVL. The reflection traces as measured by a selected one of the surface geophones is then deconvolved with this sub-LVL signature. In this way one can derive a transfer function characteristic of the additional filtering effect of the LVL above the selected depth upon the upgoing reflections. The seismic record, or more specifically the individual reflection recordings obtained with the geophones of the spread, are then separately deconvolved with the transfer function. These steps are performed either in conjunction with or independent of the source signature deconvolution steps of this invention previously described.

Within the scope of this invention the two transfer functions derived as indicated above, one based upon downgoing source signatures and the other upon upgoing reflection signatures, may be used interchangeably where circumstances warrant. Alternatively either such transfer function may be applied repeatedly as a deconvolution operator to account for both first and second order filtering effects of the LVL.

The method of this invention can be readily adapted for use in a marine environment utilizing any combination of water borne or marine bottom-coupled sources and receiving means. As with land seismic surveys, the method requires burying one or more geophone receivers below the marine bottom to a depth at which the received source signature, however generated, or its upgoing reflections, have undergone or will experience significant modification by passage either downwardly or upwardly, as the case may be, through the mud and other unconsolidated materials between the marine bottom and such depth. Once acquired, either the source signature or its reflection measured at such depth is used directly or indirectly, through derivation of the appropriate transfer function, to deconvolve the marine seismic record.

In a further modification the method of this invention can be adapted to use with buried sources such as explosives implanted within bore holes to a depth beneath at least a significant portion of the near-surface low velocity layer. In this version of the invention, the explosive signature is measured by a buried receiver suitably isolated from the forces of such explosions and by a further receiver means located above on the surface of the earth. By deconvolution, one can again derive a transfer function characteristic of the region of the low velocity layer between two such receivers. The transfer function is then used to deconvolve the seismic record obtained.

BRIEF DESCRIPTION OF THE DRAWINGS

FIG. 4(a) shows diagrammatically the paths of a source signal and its reflection from shallow horizons between a surface seismic source and a vertical array of geophones as deployed in accordance with this invention.

FIG. 4(b) shows the wavelets detected by such geophones shown in FIG. 4(a) responsive to such signal and reflections, separated by normal moveout.

FIG. 5 illustrates successive positions along a seismic line of the surface source and receiving means of FIG. 1 and the positions of a plurality of buried receivers spaced apart along such seismic line at the bottom of a near surface low velocity layer.

FIG. 6 is a block diagrammatic representation of the steps to be performed in accordance with an alternate embodiment of this invention utilizing the apparatus of FIG. 1.

DETAILED DESCRIPTION OF THE PREFERRED EMBODIMENTS

Figure 1:
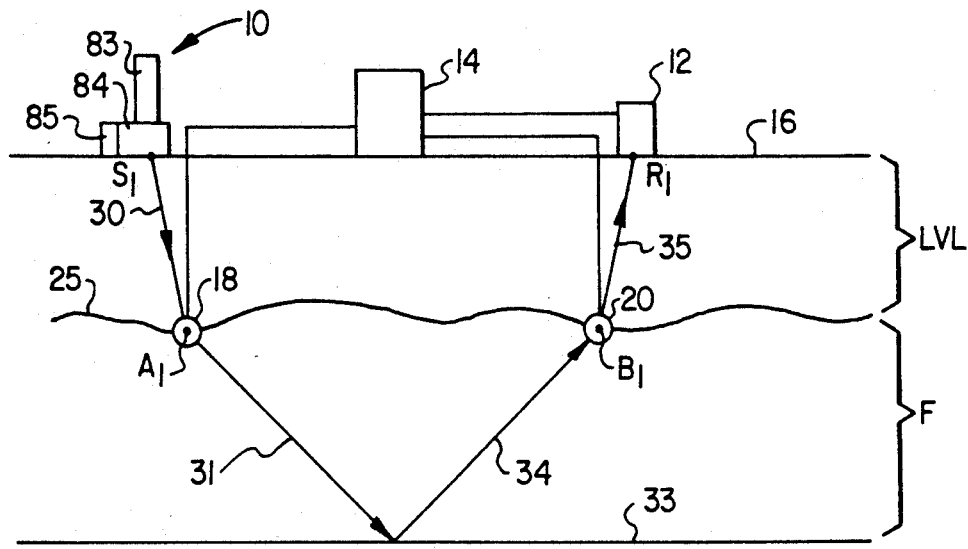
FIG. 1 is a simplified diagrammatic vertical section through the earth illustrating an arrangement of apparatus for the practice of this invention and showing the path of a downgoing seismic signal and its upgoing reflections produced by such apparatus.
Figure 2:
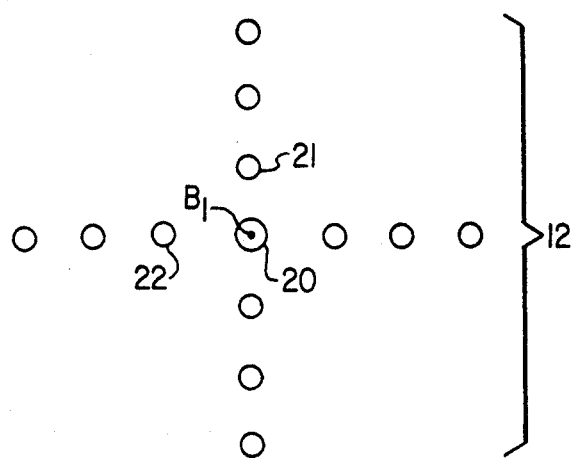
FIG. 2 is a diagrammatic plan view of a typical spread of surface geophones utilized in the practice of this invention.

With reference now to FIG. 1, apparatus for practicing one embodiment of the method of this invention comprises a seismic source 10, signal receiving means 12 and a data recording and processing truck 14 all positioned on a earth surface 16 for conduct of a conventional surface seismic survey. As best seen in FIG. 2, receiving means 12 typically consists of a spread of individual geophones or groups of geophones connected to separate recording channels in the equipment truck 14. As illustrated, receiving means 12 is a cross spread of individual geophones such as designated by reference numerals 21 and 22. At least one sub-surface geophone receiving means 18 is buried in the earth adjacent the position of the source 10 to a depth at which the signature of the source 10 is substantially modified by the filtering effect of a low velocity layer (LVL) underlying the surface 16. This requirement may of course be satisfied by locating the geophone receiving means 18 at or below the base 25 of the LVL as shown, although as will be seen, other shallower placements are advantageous. A further sub-surface receiving means 20 may in like manner be buried at base 25 of the LVL adjacent the receiving means 12. It will be understood that appropriate electrical and radio communications are established between the above apparatuses as well known to this art.

FIG. 1 further illustrates the path of propagation of an elastic wave generated in response to the activation of the seismic source 10 at point $S_1$. The wave proceeds downwardly along path 30 through the LVL to point $A_1$, next along a path 31 through an underlying earth formation F to horizon 33 resulting in reflection along a path 34 through the earth formation to point $B_1$, and finally along a path 35 through the LVL back to the surface receiving means 12 at $R_1$. The various downgoing and upgoing paths are refracted at the base 25 of the LVL because of the difference in velocities between the LVL and the formation F.

Responsive to the activation of the source 10, the source signature detected by the sub-surface receiver 18 at $A_1$ has undergone filtering by the LVL. Assuming a generally linear elastic behavior of the formation F the source signature at $A_1$ remains relatively unchanged until the upgoing reflections along the path 34 reach position $B_1$ at the base 25 of the LVL in the vicinity of the surface receiver 12. Thus, the reflections at the position $B_1$ should exhibit characteristics closely approximating those of the source signature at $A_1$. Assuming also that the LVL constitutes essentially the same filter along paths 30 and 35 and neglecting second order signal modification effects as the reflections propagate along the path 35, (to be discussed below) a spiking deconvolution operation applied to the recorded traces as detected by the receiving means 12 utilizing the known source signature at $A_1$ will now remove or compensate effectively for the filtering effect of the LVL.

Figure 3:
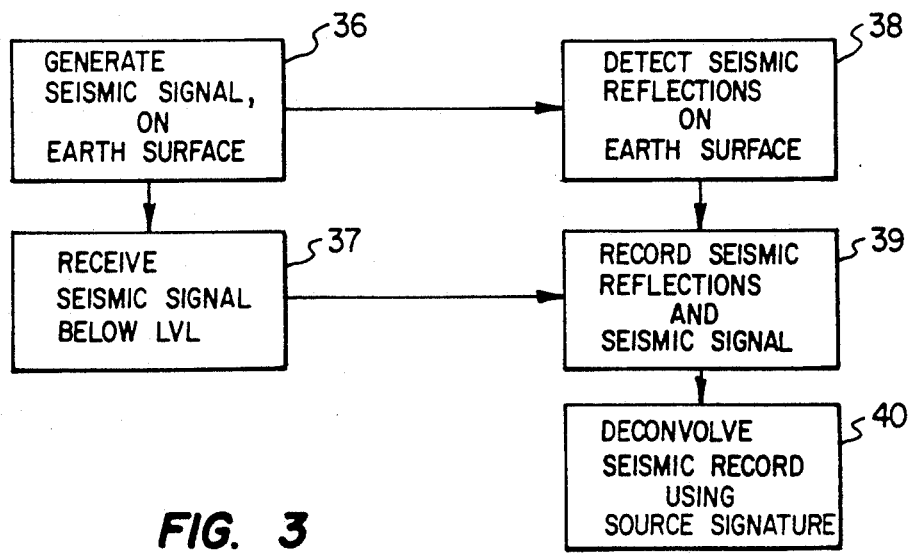
FIG. 3 is a block diagrammatic representation of the steps to be performed in accordance with one embodiment of this invention utilizing the apparatus of FIG. 1.

With reference to FIG. 3, and to summarize the discussion of the method of this invention thus far it comprises generating a downgoing seismic signal on the earth's surface (step 36) receiving the signal at a depth wherein its signature has experienced substantial modification by the filtering effect of a near surface LVL through which the signal passes (step 37); detecting on the earth's surface the upgoing reflections of the seismic signal (step 38); recording the source signal and the upgoing reflections (step 39); and finally deconvolving such recorded reflections, i.e. the seismic record, with a spiking deconvolution filter derived from the signature of such signal (step 40).

Expressed mathematically, the operations described are as follows:

$$R_s = S_s * L_1 * E * L_2.$$

where $R_s$ is the uncompensated seismic record as detected on the earth surface 16

$S_s$ is the primary source signature on the earth surface 16

$L_1$ is the filtering effect of the LVL beneath the source 10

E is the desired impulse response of the underlying earth formation, F and $L_2$ is the filtering effect of the LVL beneath the receiving means 12. Since the signal has already passed once through the LVL, this second pass results in a second order filtering effect.

$$S_w = S_s * L_1$$

where $S_w$ is the source signature at location A, beneath the LVL.

$$R_s/S_w = \frac{S_s * L_1 * E * L_2}{S_s * L_1}$$

$= E * L_2$, the seismic record compensated for $L_1$ $= E$, neglecting 2nd order effects of $L_2$ It is well known that in the art of vertical seismic profiling (VSP) it is necessary to discriminate between downgoing seismic energy arriving at a given depth in a bore hole from upcoming energy reaching the same depth from nearby reflectors. In the present invention a similar purpose is served. FIG. 4(a) illustrates a vertical array of individual geophones 60, 61, and 62 collectively forming geophone receiver 18. Direct source signal paths 65 and reflection paths 66 are shown impinging on geophones 60, 61, and 62. In FIG. 4(b) the resultant wave forms are plotted on a time scale for each geophone. Because of moveout, the successive arrival times of direct signal 68 at the three geophones form a line 69 of negative slope while the arrival times of the reflected signals 70 form a line of positive slope 71. The intersection of lines 69 and 71 makes it possible to distinguish clearly between the two types of signals. With this information an uncontaminated source signature can be identified for use in the deconvolution step of this invention. Within the scope of this invention any subsurface geophone receivers referenced hereafter may each comprise vertical arrays of individual geophones to enable more positive identification of the associated source signatures or reflections to be detected.

In an actual survey, with reference to FIG. 5, the source 10 occupies successive shot positions. $S_1-S_5$ and the receiving means 12 occupies successive positions $R_1$ $R_5$ along a seismic survey line 76. The base 25 of the low velocity layer 26 defines a series of actual or potential locations $A_1-A_5$ for determining downgoing sub-LVL source signatures and location $B_1-B_5$ for determining upgoing sub-LVL signatures. The significance of measurements at points $A_1$ and $B_1$ has already been discussed in connection with FIG. 1. If, as frequently is the case, the characteristics or depth of the LVL are believed to vary significantly along the seismic line 76, the known source signature detected at point $A_1$ may differ markedly from the corresponding downhole signature of the source 10 at other locations, such as, for example, at points $A_3$ and $A_5$. In that event, additional geophone receivers similar to sub-surface receiving means 18, for example receiving means 80 and 82 may be implanted at locations such as $A_3$ and $A_5$. Updated source signatures detected at these points can then be used to derive additional spiking deconvolution operators in the manner detailed above for deconvolving the reflected traces attributable to the activation of the source 10 at surface shot points S₃ and S₅. For intermediate shot point positions, for example, point S₂, one can by averaging or interpolation between the source signatures at A₁ and A₃, derive or predict a signature representative of the sub-LVL signal condition at point A₂. The need for obtaining these updated buried receiver readings should be evaluated with the aid of any data available to the explorationist regarding the LVL such as soil surveys of the area in question.

In order to further refine the method of this invention one may obtain a baseline measurement of the source signature of the source 10 at each of its shot point locations on the surface of the earth 16. For example, as shown in FIG. 5, if the source 10 is one of a number of well-known varieties of impactive or vibratory sources utilizing a force generating means 83 for moving a baseplate 84 in surface to surface contact with the earth, suitable motion detection means such as three orthogonal velocity meters 85 can be joined to such baseplate 84 in a manner to detect its motion in the vertical and two horizontal directions (one in line with the axis of the recording truck 14 and the others orthogonal to it). The wave form described by the motion of the source 10 is a function of the properties of the baseplate 84 and its interaction or coupling with the soil presumed to exist within the low velocity layer immediately beneath the source 10. For an impulsive source, it is critical that the velocity meters 85 be capable of accurately recording the effects of motion of the baseplate 84 at upwards of 50 feet per second velocity and displacements on the order of inches within a time of action measured in milliseconds. An instrument adapted to satisfy these requirements is, for example, the VT-110 Velocity Transducer manufactured by Electrotechnical Labs of Houston, Tex. Again, assuming the source 10 is of the impulsive type, its baseplate signature having a total energy spectrum extending well above 100 Hz., is the excitation source wavelet for the seismic energy reflected from the subsurface horizon 33 with a frequency content generally below 100 Hz. The action which transforms the high frequency baseplate signature into a low frequency seismic wave form is, of course, the filtering effect of the low velocity layer. It is believed that major changes in the primary source signature of the source 10 occur within the baseplate/surface coupling zone constituting the first few inches of earth beneath this source 10 and are therefore sensed by movement of the baseplate 84 of the source 10 and reflected as changes in its signature. This is the first detectable source signature and it may vary significantly from one shot point to another because of differences in the soil as to compressibility and plasticity. Therefore, the baseplate signature, after suitable calibration, as described below, can be used to accurately predict most of the filter alteration to the source wavelet produced by the low velocity layer. This predicted wavelet can be used in place of an actual downhole measurement as a new signature deconvolution operator. The missing link between the baseplate signature of the source 10 and the signature needed for more reliable data processing and supplied by this invention is the determination of a transfer function which better expresses the filtering characteristics of the low velocity layer. If the base plate signature, and the signature of the wavelet of the source 10 below the low velocity layer, are known it is a straightforward mathematical operation to derive the intervening weathering transfer filter. These steps can be expressed symbolically as follows:

$$S_b = S_s * C$$

where
$S_b$ = coupling altered base plate signature of plate 84
$C$ = filtering effect of coupling zone $$S_w = S_b * L_w$$

where
$L_w$ = weathering transfer filter effect between coupling zone and base of LVL at A, $$L_w = S_w / S_b$$

and for comparative purposes, $$L_1 = \frac{S_b * L_w}{S_s}$$

The baseplate 84 and the coupling zone C form a resonant system. Therefore, the observed changes in $S_s$, as exemplified by the base plate signature, vary in response to changes in the resonant system and hence in the filter C. Thus changes in $S_s$ may be used to infer changes in $S_b$. The wave forms $S_b$ and $S_w$ differ only by the additional filtering effect, $L_w$, of the layer between the immediate baseplate coupling zone and the base of the LVL. Thus the procedure for determining this transfer function is to measure both the wave forms $S_s$ and $S_w$ in a calibration experiment which may be updated to quantify the variation of both signatures as a function of varying baseplate/soil coupling. This is done by shooting in areas of changing surface conditions, and determining the appropriate transfer functions by deconvolution. With additional reference now to FIG. 5, assume that a preacquisition calibration test is conducted with the source 10 at location S₁ with its sub-surface signature measured at point A₁ by the receiving means 18. The signature obtained at point A₁ of course may directly be used in a spiking deconvolution operation. For subsequent positions of the source 10 such as at point S₂ the measured source signature, $S_s$, is convolved with the calculated transfer function, $L_w$ so as to derive or predict the corresponding source signature at the position A₂. This procedure can then be repeated for all subsequent shot point positions of the source 10 and the predicted source signatures may then be used to on a shot-by-shot basis to deconvolve the reflections attributable to the successive shots. It is apparent that because the baseplate/coupling source signature, $S_s$, is measured at each shot point the downgoing source signatures predicted as described are better able to account for laterally varying conditions of the LVL. However, if desired, one may perform additional calibration tests equivalent to that described utilizing at further signature recording positions such as exemplified by S₃ and A₃ and thereby account more precisely for changing near surface conditions. One can then also obtain an averaged or interpolated value of the calculated transfer function, $L_w$, corresponding to positions S₁ and S₃. From these values one can estimate an intermediate transfer function value from which to predict a sub- LVL source signature value for intermediate point $A_2$ and other similar intermediate points.

Summarizing the alternate embodiment of this method described immediately above, it comprises measuring the sub-surface or downhole source signature of a surface seismic source below the LVL at least one shot point adjacent a seismic line (step 90), and the surface signature of the source at such shot point exemplified by base plate motion (step 91) and combining the two resultant source signature utilizing standard signal recording and processing capabilities (step 92) in order to calculate a near surface transfer function (step 93). This transfer function is then convolved with the surface source signatures at other shot points along the seismic line in order to predict the corresponding sub-surface source signatures at such other shot points (step 94). These predicted source signatures are then used to derive spiking decon operators with which to deconvolve the reflections of the various source signatures obtained at such other shotpoints (step 95).

Thus far in the discussion of this invention the filtering effects, $L_2$, of the LVL such as along path 35 (FIG. 1) have been neglected. However, such effects will always be present even if the LVL is regarded as essentially uniform in characteristic and thickness over the area of the seismic survey in question. In addition, the possibility exists that the LVL may vary significantly in thickness from 10's to 100's of feet in the space of a few miles. Furthermore, LVL velocities may vary widely, for example, from 1,000 to 5,000 ft./sec. Finally, the source 10 itself, because of the coupling effect explained above, modifies the filter characteristics of the LVL. To account for one or more of these potential effects the method of this invention can be further refined by obtaining a measurement of the reflection signature attributable to source 10, taken at a depth such that such signatures will undergo substantial modification in passing upwardly through the LVL. Thus, as shown in FIG. 1, such reflection signatures can be monitored at location $B_1$, at the base 25 of the LVL in the vicinity of the receiving means 12 by means of geophones receiving means 20. Deconvolution of the reflection traces received by one of the surface geophones of receiving means 12, such as geophone 21 (FIG. 2) with the signature at $B_1$, yields the transfer function $L_2$. This transfer function may then be applied as an operator to further deconvolve the entire seismic record i.e., the output of each surface geophone 21, 22 or the like processed separately as previously compensated for the filtering effect $L_1$. This more accurately approximates the true echo sequence of formation F. Expressed in equation form:

$$R_s = S_b * C * L_w * E * L_2$$

$$R_s/S_w = \frac{S_b * C * L_w * E * L_2}{S_b * C * L_w},$$

yielding 1st order *LVL* compensaton

Deconvolving this result with $L_2$ we get E, thereby providing 2nd order LVL compensation.

Figure 7:
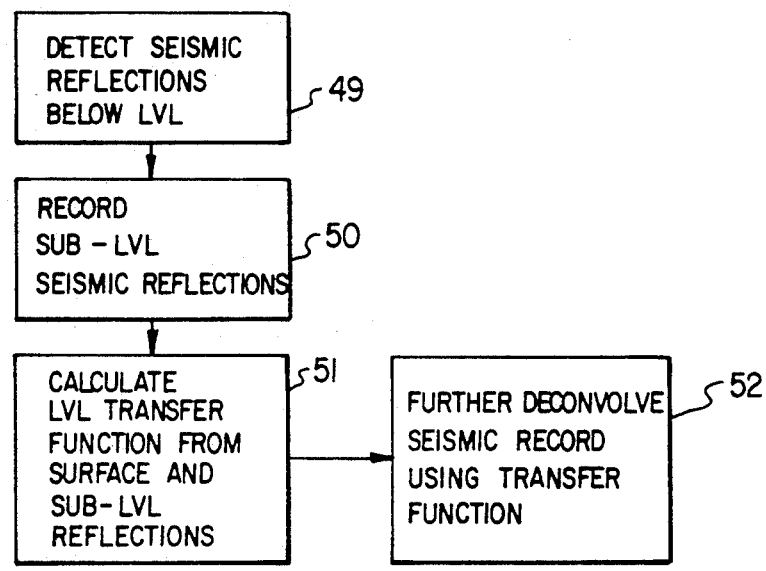
FIG. 7 is a block diagrammatic representation of the steps to be performed in accordance with further alternate embodiment of this invention utilizing the apparatus of FIG. 1.

FIG. 7 illustrates the modified procedures outlined above comprising the optional additional step 49 of detecting the upgoing seismic reflection of the seismic signal below the LVL in the vicinity of the surface geophones of a surface spread for detecting such reflections; the step 50 of recording such reflections; the step 51 of deconvolving such reflections as detected by one of such surface geophones with said reflections measured below the LVL to derive a transfer function for the LVL in such vicinity; and finally the step 52 of deconvolving the seismic record utilizing said transfer function.

In the manner described above reflection signatures can be obtained at any point beneath any position of receiving means 12. Thus, as an example, by burying geophone receiving means 96 and 97 at location $B_3$ and $B_5$ one can determine sub-LVL reflection signatures at these locations. By calibration, one may determine further transfer functions indicative of the characteristics of the LVL at these locations and thereby obtain updated deconvolution operators as appropriate.

Within the scope of this invention, the use of transfer function operators based upon either source signature or reflection signature measurements may be combined, or used independently of one another. Furthermore, either type of operator may be substituted for the other where it is not feasible to monitor both downgoing source signatures and upgoing reflection signatures below the LVL. Finally, one can repeat the same deconvolution step using either type of transfer function so as to "remove" the LVL filtering effect twice in the seismic record.

Figure 8:
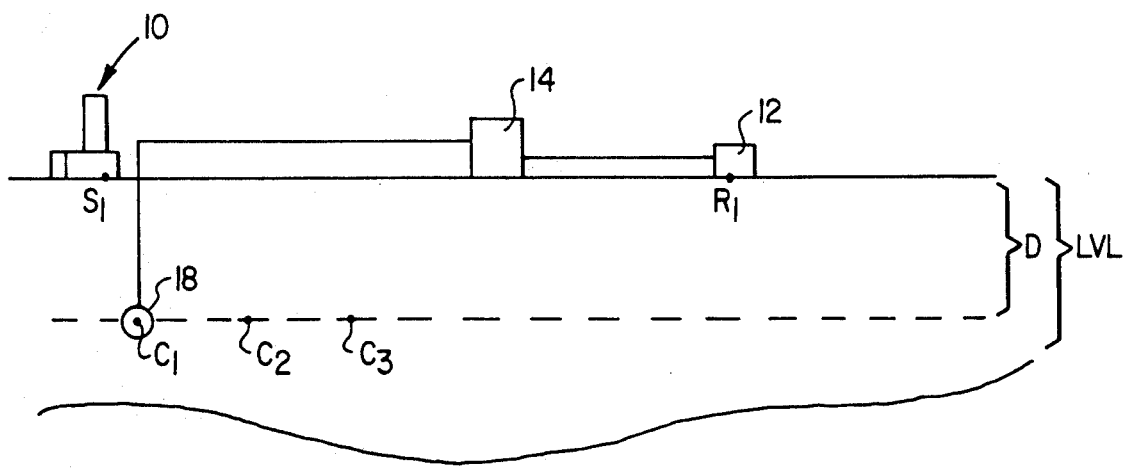
FIG. 8 shows in simplified diagrammatic form a vertical section through the earth illustrating the deployment of apparatus in accordance with a still further alternate embodiment of this invention.

A logical extension of the method just described depends upon the realization that by measuring seismic source signatures at any two depths, one can by deconvolution functionally describe the intervening filtering characteristics of the LVL. Thus, for example, with reference to FIG. 8, one may monitor the signature of the source 10 at the surface at $S_1$ and at a depth D beneath position $S_1$ at position $C_1$ selected between 12 to 20 feet. At depths in this range, the zones of top soil and subsoil have usually been penetrated. This insures that the most drastic filtering effects of the LVL has been felt by any source signature generated at the earth's surface. The transfer function relating to the arbitrary thickness of LVL established by depth D is used in predicting subsequent source signatures at other locations such as $C_2$ and $C_3$ at the same depth, D. With or without periodic recalibration of this transfer function this procedure has the merit that it eliminates any need for estimating or measuring the varying depth of the LVL. This is particularly useful in situations in which considerations of time and cost make such LVL depth determinations impractical. If, on the other hand, the objective is to place buried receivers at or below the base of the LVL, one of the best methods for determining LVL thickness is an uphole survey such as described in detail in Telford et al, *Applied Geophysics*, copyright 1976 by Cambridge University Press, at pp 307-8, the contents of which are hereby in corporated by reference. In view of the rapid attenuation of LVL filtering effects with depth, the difficulty in making a precise determination of LVL thickness is not regarded as a significant factor in the practice of this invention.

In order to practice the method of this invention following the determination of transfer functions as described, it is desirable to incorporate a digital computer (not shown) in the source 10 to permit determination of the appropriate transfer function applicable to the area under investigation and to transmit the derived downgoing source signature values by radio link to the recording truck 14 for correlation with the reflected seismic records.

In what has been described and illustrated thus far the baseplate motion of the source 10 has been considered to represent the surface source signature to be utilized in calculating the various "source side" transfer functions. Within the scope of this invention one may alternately determine a source signature for the source 10 by implanting a surface receiver (not shown) in the earth immediately adjacent to the source 10. The underlying purpose of all such surface source signature measurements is clearly to establish a baseline value which can be compared to corresponding downhole source signatures.

Figure 9:
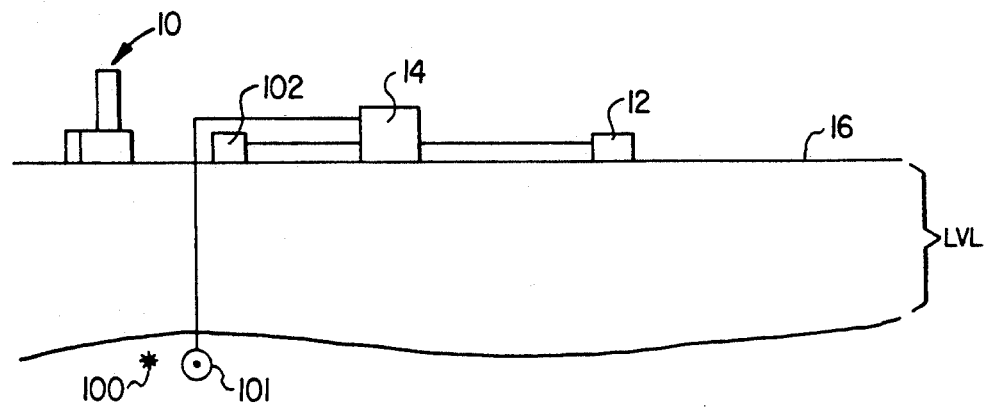
FIG. 9 is a diagrammatic vertical section through the earth illustrating an arrangement of apparatus for practice of a yet further alternate embodiment of this invention.

Within the scope of this invention, a seismic signal or signals may be initiated either on the earth's surface or at some depth. Thus, for example, as shown in FIG. 9, an explosive charge 100 is buried in the earth underneath the source 10 below the LVL. A geophone receiver 101 is buried also below the LVL close to but suitably isolated from the charge 100 such as in an adjacent bore hole (not shown). The isolation should simply be such as to insure that the electrical connections between receiver 101 and the earth's surface are not interrupted by explosion prematurely. Geophone receiver 102 is positioned on the earth's surface above receiver 101 in the vicinity of the source 10.

Since the charge 100 is located beneath the LVL, upon initiation the resultant signal as received directly by receiver 101 is unfiltered by the LVL. However, since the seismic signal travels in all directions, it also travels by the shortest path through the LVL to the earth's surface and is detected by receiver 102. By deconvolution, these upper and lower source signatures can be used to derive a transfer function characterizing the intervening filtering effect of the LVL. This transfer function may now be used to deconvolve the reflections obtained on the surface with the receiving means 12.

Figure 10:
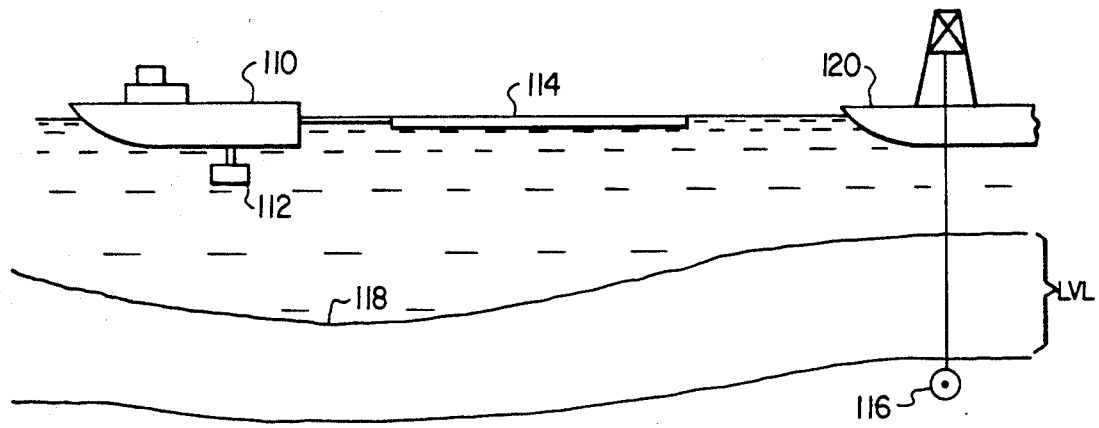
FIG. 10 is a diagrammatic vertical section through the earth in a marine environment illustrating an arrangement of apparatus for practice of a yet further alternate embodiment of this invention.

Finally, it should be understood that while the method of this invention has been described exclusively in connection with the conduct of land seismic surveys, it is extendible to the performance of marine seismic profile. With reference to FIG. 10, a marine seismic survey can be conducted utilizing a source boat 110 carrying a source 112 and trailing a geophone streamer 114 for sensing seismic reflections. A geophone receiver 116 may be implanted in the earth below the marine bottom 118 such as with the aid of a drill boat 120. An LVL exists below the marine bottom 118 which of course differs in composition from that ordinarily experienced at the earth's surface. The mud depth of such LVL within which the most drastic filtering effects are seen varies from as little as a few inches to many feet. For example, in offshore locations with current-scoured bottoms, the mud layer may be very thin. Conversely, in a river delta the soft mud layer may be considerable. In any event, a source signature obtained by the receiver 116 can be used to deconvolve a seismic record obtained with the aid of the streamer 114 in accordance with the teachings of this invention to compensate for the filtering effects of the LVL. Alternatively one can use receiver 116 to monitor the reflection signature at depth and use it to derive a "reflection-side" transfer function, so as to form a decon operation as taught by this invention. Obviously, this invention can also be practiced in a marine environment with both the source and the receiving means coupled to the marine bottom 118.

The description of the preferred embodiments of this invention is illustrative only and those skilled in this art will be able to devise other configurations and procedures to practice such invention without departing from the scope thereof as set forth in the appended claims.

What is claimed is:

1. A method of seismic exploration comprising the steps of:
    (a) activating a seismic source sequentially at a series of spaced apart shot points on the surface of the earth along a seismic line so as to generate a like series of down-going seismic signals in the earth;
    (b) receiving the upgoing reflections of such signals at the surface of the earth remote from said shot points to provide a seismic record;
    (c) receiving each of said signals on the surface of the earth adjacent the shot point at which each said signal was generated;
    (d) receiving one of said signals beneath the shot point at which said one signal was generated at a depth wherein the signature of said one signal is substantially modified by the filtering effect of a near surface low-velocity layer through which said one signal passes;
    (e) deconvolving said one signal as received at said depth with said one signal as received on the surface of the earth so as to derive a transfer function characteristic of said filtering effect of said low velocity layer;
    (f) convolving said transfer function with each of the other of said signals as received on the surface of the earth in order to predict a value of each of said other signals at said depth; and
    (g) deconvolving said seismic record with said received and predicted signals at said depth on a shot-by-shot basis.

2. The method as claimed in claim 1 wherein said seismic source includes baseplate means whose motion against the earth's surface at each said shot point generates each said signal and wherein said step (c) comprises measuring said motion.

3. The method as claimed in claim 1 wherein geophone means are positioned on the earth's surface adjacent said source at each said shot point for receiving each of said signals.

4. A marine seismic exploration method comprising the steps of:
    (a) activating a seismic source sequentially at a plurality of spaced apart shot points along a marine bottom so as to generate a series of down-going seismic signals in the earth;
    (b) receiving the reflections of said signals back to said marine bottom so as to provide a seismic record;
    (c) measuring the signature of said source at each of said shot points on said marine bottom;
    (d) measuring the signature of said source beneath one of said shot points at a depth wherein said signature is substantially modified by the filtering effect of a low velocity layer through which said signal passes;
    (e) deconvolving said signature at said depth with the signature of said source at said one shot point on the marine bottom to derive a transfer function characteristic of the filtering effect of said low velocity layer; and
    (f) convolving said transfer function with each of said signatures at the other of said shot points in order to predict further source signatures at said depth corresponding respectively to such other shot points; and (g) deconvolving the seismic section on a shot-by-shot basis with said measured and predicted signatures at said depth.

5. The method as claimed in claim 1 wherein the product of said step (g) is subjected to a repeated deconvolution with said received and predicted signals at said depth.

* * * * *